United States Patent
Weber et al.

(10) Patent No.: US 7,885,913 B2
(45) Date of Patent: Feb. 8, 2011

(54) DISTRIBUTED COLLABORATIVE KNOWLEDGE GENERATION SYSTEM WHEREIN STUDENTS PERFORM QUERIES USING A DYNAMIC KNOWLEDGE DATABASE AND RETRIEVED SUBSETS OF DATA ARE SHARED WITH MULTIPLE USERS ON THE WEB

(75) Inventors: Karon A. Weber, San Francisco, CA (US); Ron Martinez, San Francisco, CA (US); Samantha M. Tripodi, San Francisco, CA (US); Pasha Sadri, San Jose, CA (US); Jonathan J. Redfern, Palo Alto, CA (US); Lorna Borenstein, Los Gatos, CA (US); Bill W. Scott, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 674 days.

(21) Appl. No.: 11/932,562

(22) Filed: Oct. 31, 2007

(65) Prior Publication Data

US 2008/0243727 A1 Oct. 2, 2008

Related U.S. Application Data

(60) Provisional application No. 60/920,679, filed on Mar. 28, 2007.

(51) Int. Cl.
*G06F 17/00* (2006.01)
(52) U.S. Cl. .......................................... 706/46; 434/322
(58) Field of Classification Search .................. 434/322, 434/350; 706/12, 14, 16, 25, 45–49, 60–62
See application file for complete search history.

(56) References Cited

U.S. PATENT DOCUMENTS

| 6,496,681 | B1* | 12/2002 | Linton .......................... 434/350 |
| 6,988,138 | B1 | 1/2006 | Alcorn et al. |
| 2003/0084015 | A1* | 5/2003 | Beams et al. .................. 706/47 |
| 2005/0214729 | A1* | 9/2005 | Greenly et al. ........... 434/307 R |
| 2006/0127869 | A1* | 6/2006 | Fields et al. ................. 434/350 |
| 2006/0172274 | A1* | 8/2006 | Nolasco ....................... 434/350 |

(Continued)

FOREIGN PATENT DOCUMENTS

EP   1 638 047 A1   3/2006

(Continued)

OTHER PUBLICATIONS

International Search Report mailed on Aug. 20, 2008, for PCT Application No. PCT/US2008/058062, filed on Mar. 24, 2008, four pages.
Written Opinion mailed on Aug. 20, 2008, for PCT Application No. PCT/US2008/058062, filed on Mar. 24, 2008, eight pages.

*Primary Examiner*—David R Vincent

(57) ABSTRACT

System and method related to a distributed collaborative knowledge generation system are disclosed. The distributed collaborative knowledge generation system includes one or more databases configured to store content information related to the distributed collaborative knowledge generation system, a search services module configured to search for the content information, a web services module configured to retrieve and gather the content information, a presentation services module configured to share the content data with multiple users, and a data services module configured to manage the content information by providing interfaces between the one or more databases, the search services module, the web services module, and the presentation services module.

14 Claims, 18 Drawing Sheets

U.S. PATENT DOCUMENTS

| | | |
|---|---|---|
| 2006/0282386 A1 | 12/2006 | Szeto et al. |
| 2006/0286536 A1* | 12/2006 | Mohler et al. ............... 434/350 |
| 2007/0200713 A1 | 8/2007 | Weber et al. |
| 2007/0288415 A1* | 12/2007 | Sapp et al. .................... 706/47 |
| 2008/0052369 A1 | 2/2008 | Weber et al. |
| 2008/0052372 A1 | 2/2008 | Weber et al. |
| 2009/0311657 A1* | 12/2009 | Dodelson et al. ............ 434/350 |

FOREIGN PATENT DOCUMENTS

| | | |
|---|---|---|
| KR | 2001-0107007 A | 12/2001 |
| KR | 2002-0026202 A | 4/2002 |
| KR | 2003-0000932 A | 1/2003 |
| KR | 2003-0081200 A | 10/2003 |

* cited by examiner

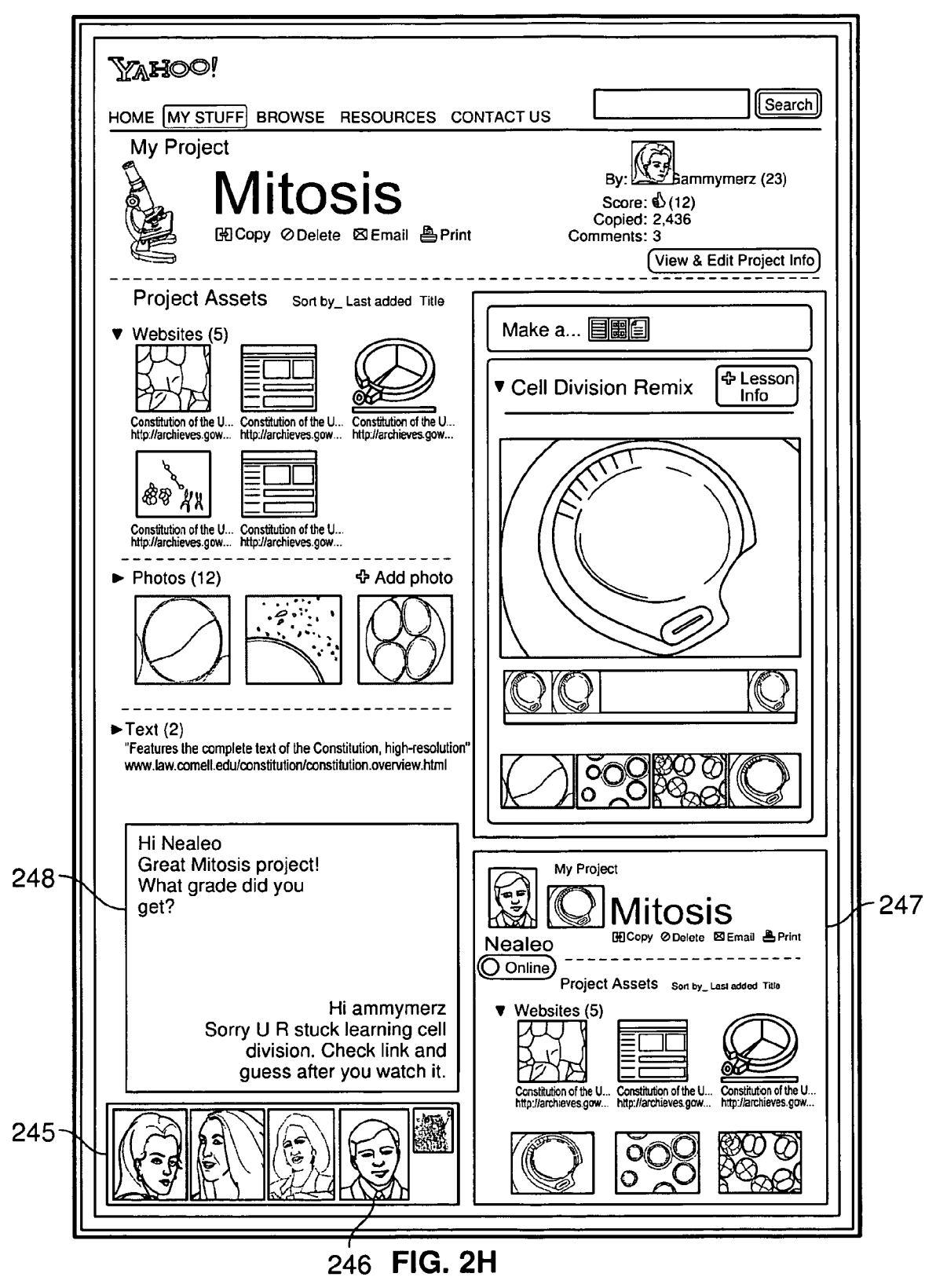

DISTRIBUTED COLLABORATIVE KNOWLEDGE GENERATION SYSTEM WHEREIN STUDENTS PERFORM QUERIES USING A DYNAMIC KNOWLEDGE DATABASE AND RETRIEVED SUBSETS OF DATA ARE SHARED WITH MULTIPLE USERS ON THE WEB

CROSS-REFERENCE TO RELATED APPLICATIONS

This application claims the benefit of application No. 60/920,679, "A Distributed Collaborative Learning System," filed Mar. 28, 2007, which is incorporated herein in its entirety by reference.

FIELD OF THE INVENTION

The present invention relates to the field of Internet applications. In particular, the present invention relates to a distributed collaborative knowledge generation system.

BACKGROUND OF THE INVENTION

In recent years, there are many online courses offered on the Internet. Many of these courses allow students to learn subjects of their interests at their own pace and in the comfort of their home. However, one of the problems with such conventional online courses is that they are practically a one-way transmission of information from the school's website to the student's computer terminal. There is no interaction between the students and the teacher and there is no discussion of the course materials among the teachers and the students. Another problem with the conventional online courses is that the course materials are typically stagnant throughout the duration of the course and often unchanged for months and years after the courses are offered. Yet another problem with the conventional online courses is that the quality and currency of course materials may be rooted in an individual or in a fixed small group of individuals. This model of course material development and authoring has not changed for decades. Yet another problem with the conventional online courses is that the course materials are not adapted to variations in certification or municipality requirements.

Therefore, there is a need for a distributed collaborative knowledge generation system that can address the above shortcomings of the current online educational programs.

SUMMARY

The present invention relates to a distributed collaborative knowledge generation system. In one embodiment, the distributed collaborative knowledge generation system includes one or more databases configured to store content information related to the distributed collaborative knowledge generation system, a search services module configured to search for the content information, a web services module configured to retrieve and gather the content information, a presentation services module configured to share the content data with multiple users, and a data services module configured to manage the content information by providing interfaces between the one or more databases, the search services module, the web services module, and the presentation services module.

In another embodiment, a method for facilitating sharing of knowledge on the Internet includes gathering information about a subject from the Internet, generating a knowledge database for storing the information gathered, improving the knowledge database by incorporating inputs from one or more users, publishing the knowledge database on the Internet, performing a search of the subject against the knowledge database, and continuously improving the knowledge database using results of the search.

In yet another embodiment, a method for assisting an educational project includes providing a knowledge database for storing user-generated content, providing a website for sharing the user-generated content related to the educational project, and facilitating collaborations among multiple users to communicate or improve the user-generated content.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 2B illustrates standards-based educational assets according to an embodiment of the present invention.

FIG. 2C illustrates a method for searching and browsing community and partner content according to an embodiment of the present invention.

FIG. 2D illustrates tools for publishing user-generated content according to an embodiment of the present invention.

FIG. 2H illustrates a method of distributed collaborative knowledge generation through real-time communications with other students according to an embodiment of the present invention.

FIG. 3B illustrates a method for generating a collaborative knowledge collection according to an embodiment of the present invention.

FIG. 3C illustrates another method for generating a collaborative knowledge collection according to an embodiment of the present invention.

DESCRIPTION OF EMBODIMENTS

Disclosures are provided for a distributed collaborative knowledge generation system. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
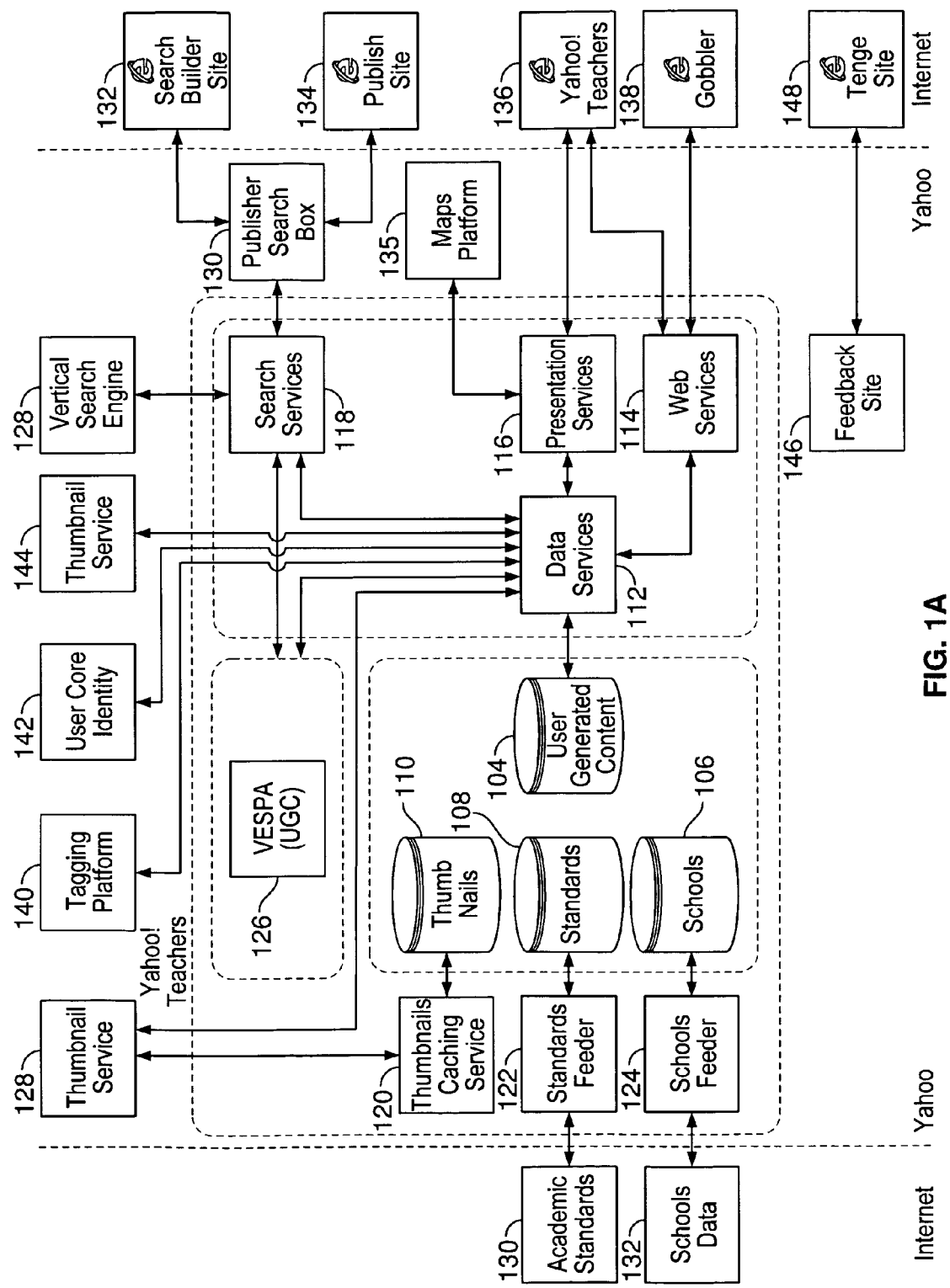
FIG. 1A illustrates a distributed collaborative knowledge generation system according to embodiments of the present invention.

FIG. 1A illustrates a distributed collaborative knowledge generation system according to embodiments of the present invention. In the example shown in FIG. 1A, the distributed collaborative knowledge generation system includes a database 102 for storing content information related to the distributed collaborative knowledge generation system, and various service modules for retrieving, gathering, managing, and presenting the content information. The database 102 includes a user-generated content database 104 for storing user-generated content, a schools database 106 for storing school data, a standards database for storing information related to educational standards, and a thumbnails database 110 for storing information of certain websites of interest. Each of the databases may be updated periodically according to a predetermined schedule or may be updated on demand. The service modules include data services module 112, web services module 114, presentation services module 116, search services module 118, thumbnails caching service module 120, standards feeder module 122, and schools feeder module 124, and a vertical search platform (VESPA) 126.

The thumbnails caching service module 120 may be supported by a thumbnail service 128 that obtains image snapshots of a website and makes a thumbnail image of the webpage. It allows a user to see an archived webpage before gathering information from that webpage. The standards feeder module 122 may be supported by an academic standards service 130 that provides academic standards information of various sources to the distributed collaborative knowledge generation system. For example, the academic standards information may include the customized requirements for curriculum for mathematics for grade 7. This may be delivered either as a national standard or meet the varied standards set by the individual states across the nation. The standards enable a policy setting body to enforce certain educational requirements for schools as established by the No Child Left Behind Act of 2001. The schools feeder module 124 may be supported by a schools data service 132 that provides school data from various schools. For example, a teacher may post assignments and lesson plans to the distributed collaborative knowledge generation system through the schools data service 132.

The search services module 118 may be supported by a vertical search engine 128 and a publisher search box 130 to provide targeted searches for the users. The vertical search engine 128 performs vertical searches against the knowledge database of the distributed collaborative knowledge generation system. The publisher search box 130 provides the capability for a user to search the user's own website. For example, the publisher search box 130 may use a search builder site 132 to generate code for searching a specific website. The publisher search box 130 may further use a publisher site 134 for conducting the targeted search.

The presentation services module 116 drives the maps platform 135 and the Yahoo! Teacher website 136, which provide two of the user interfaces for the distributed collaborative knowledge generation system. The presentation services module 116 is configured to display content information from the database 102 in one or more of calendar view, map view, grid view, and list view. A method for presenting information in multiple views on a user device is described in U.S. patent application Ser. No. 11/656,052, entitled "Method and System for Presenting Information with Multiple Views," which is incorporated herein by reference in its entirety. The web services module 114 includes a data collection module 138 (also referred to as the gobbler application) that is configured to gather and annotate content information with implicit and explicit metadata. A method for collecting information on the Internet is described in U.S. patent application Ser. No. 11/508,596, entitled "Persistent Saving Portal," which is incorporated herein by reference in its entirety.

The data services module 112 bridges between the databases 102, the web services module 114, the presentation services module 116, and the search services module 118 for managing the use of content information among the multiple service modules. The data services module 112 further interfaces with a tagging platform 140 for tagging the content information from one or more input sources, a user identity module 142 for identifying users of the distributed collaborative knowledge generation system, and a user profile module 144 for managing a user database of the distributed collaborative knowledge generation system. The data services module 112 further interfaces with a feedback service website 146, which collects users' feedback through a website (tango site) 148 on the Internet.

Figure 1B:
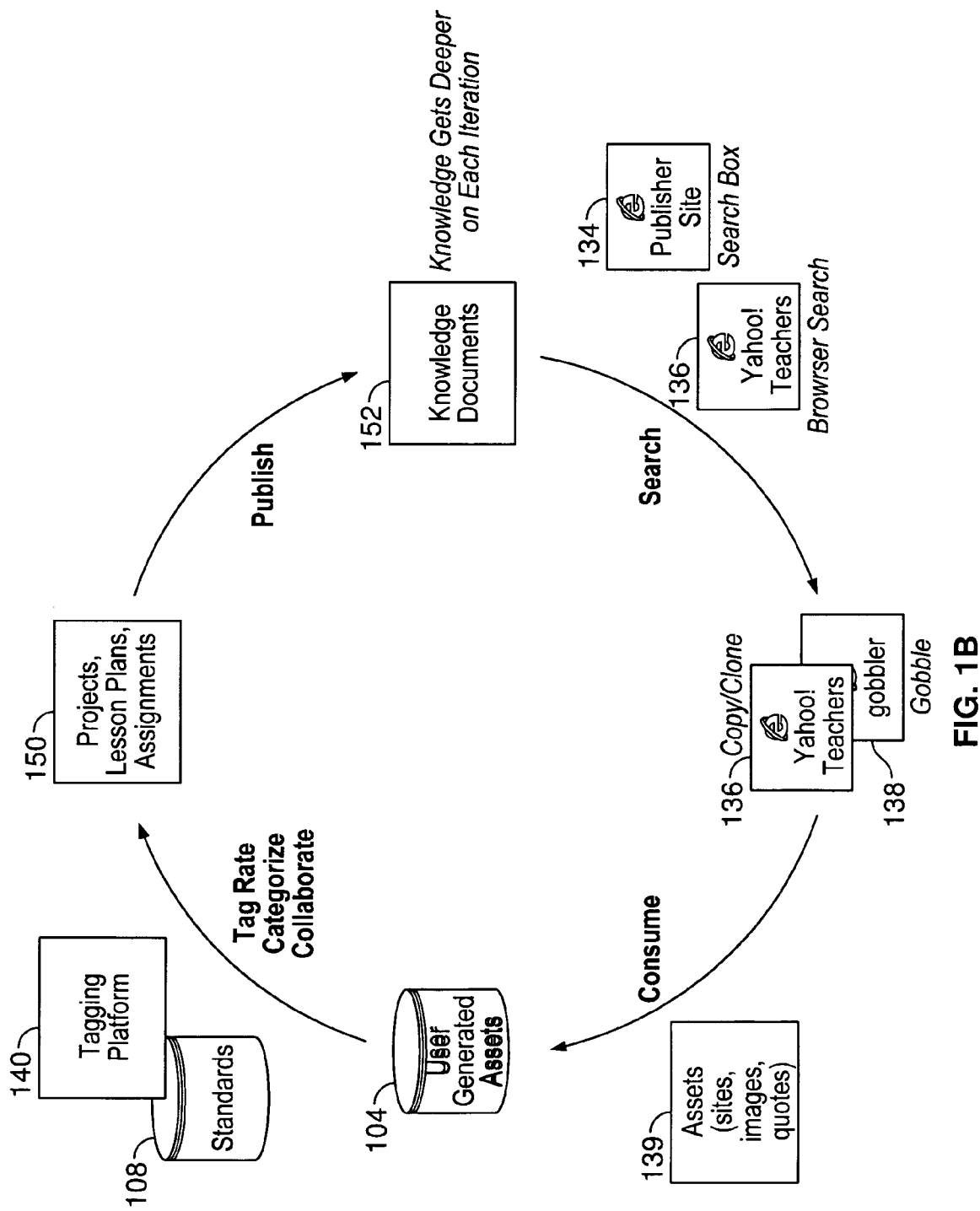
FIG. 1B illustrates a method for facilitating sharing of knowledge on the Internet according to embodiments of the present invention.

FIG. 1B illustrates a method for facilitating sharing of knowledge on the Internet according to embodiments of the present invention. In this example, a portal may be used to gather, annotate, organize, and share materials from the World Wide Web to supplement the curriculum for the classroom through the gobbler application 138. A method for gathering, annotating, organizing, and sharing materials from the web is described in U.S. application Ser. No. 11/508,596, entitled "Persistent Saving Portal," which is incorporated herein in its entirety by reference. The information may be annotated based on user-specified metadata or based on contextual metadata of a user's environment either manually or automatically.

The method consumes the information and generates a knowledge database, also referred to as the user-generated content/assets 104, for storing the information gathered. The assets 139 may include websites, images, and quotes related to the subject of interest. Then, the knowledge database is improved by incorporating inputs from one or more users. For example, content data in the knowledge database may be tagged based on user-provided metadata. Content data in the knowledge database may also be rated using a predefined ranking method and user comments. In addition, content data in the knowledge database may be categorized according to a set of predetermined categories.

The method may use the user-generated assets 104 in combination with educational standards, school data to create projects, lesson plans, and assignments 150. Note that using this method, any type of documents may be created, including but not limited to rubrics, worksheets, tests, etc. These projects, lesson plans, and assignments are published on the Internet as knowledge documents 152, which may be versioned and shared by multiple users. The published knowledge document 152 may then be browsed on the Internet, and targeted searches may be performed against the knowledge database via the publisher's website 134 or via the Yahoo! Teachers website 136, for example. The method improves the knowledge database by repeating the above process continuously. Note that with this iterative process, deeper knowledge may be accumulated. Specifically, the more metadata associated with the knowledge documents, the more contextual information is made available to the knowledge documents, which allows users to conduct a more meaningful and intelligent search of the knowledge database.

Figure 2A:
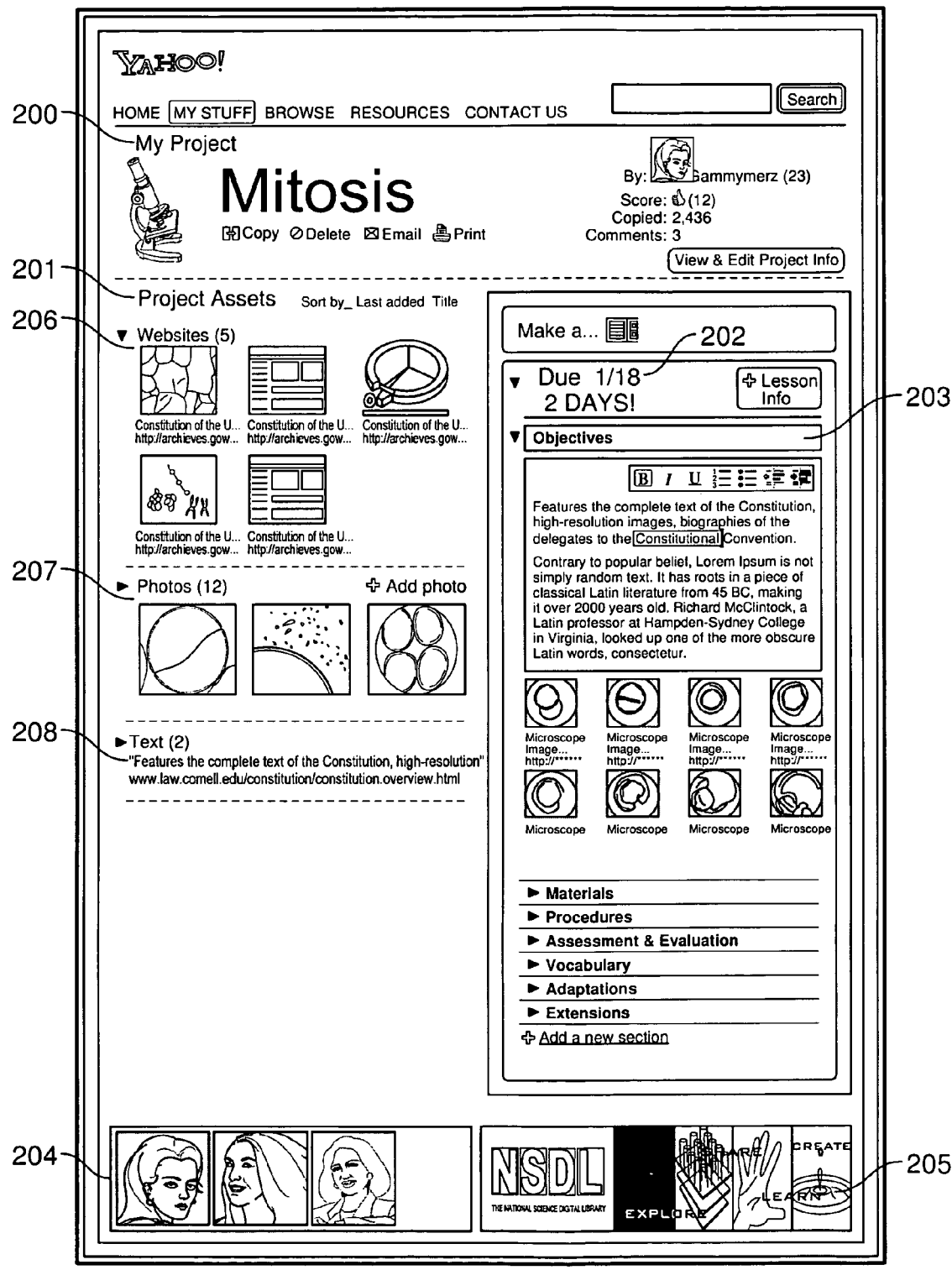
FIG. 2A illustrates a presentation of a student assignment according to an embodiment of the present invention.

FIG. 2A illustrates a presentation of a student assignment according to an embodiment of the present invention. As shown in FIG. 2A, the webpage displaying the student assignment Mitosis includes a project summary section 200, a project assets section 201, a due date reminder 202, a detailed description section 203, project team members 204, and a link to additional resources 205. The project assets section 201 further includes information the student gathered from the Internet or from other sources, such as websites 206, photo images 207, and quotes 208 in the form of text. In this example, the due date reminder 202 indicates that this assignment is due in two days on January 18. The detailed description section 203 includes descriptions on objectives, materials, procedures, assignments and evaluations, vocabularies, adaptations, and extensions of the project. Details about each of the above topics may be further displayed by clicking on an arrow next to a topic. In this example, more information about the objectives of the project is displayed.

Figure 2B:
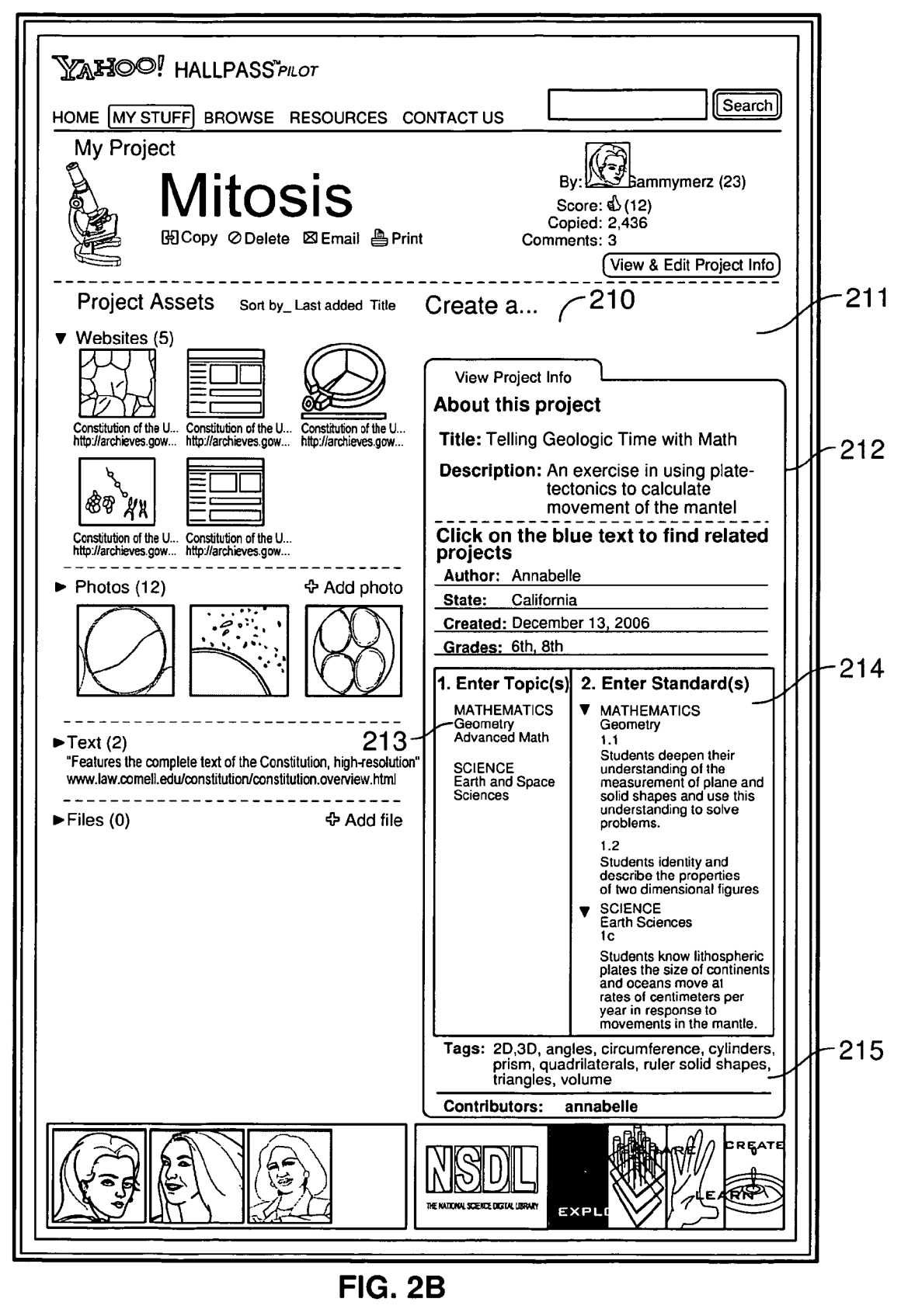

FIG. 2B illustrates standards-based educational assets according to an embodiment of the present invention. In this example, the Mitosis webpage includes a link to teacher's lesson plan 210 and a link to student assignment 211. The webpage further includes a view project information section 212, where subjects to be learned are matched to the required educational standards according to the student's state and grade level. For instance, the teacher enters the topic(s) to be learned in column 213, and the corresponding educational standards are provided in column 214. Note that there are several tags 214 (key words) associated with the topic that are also displayed. These tags are useful for providing contextual information and improving relevance of returned search results.

Figure 2C:
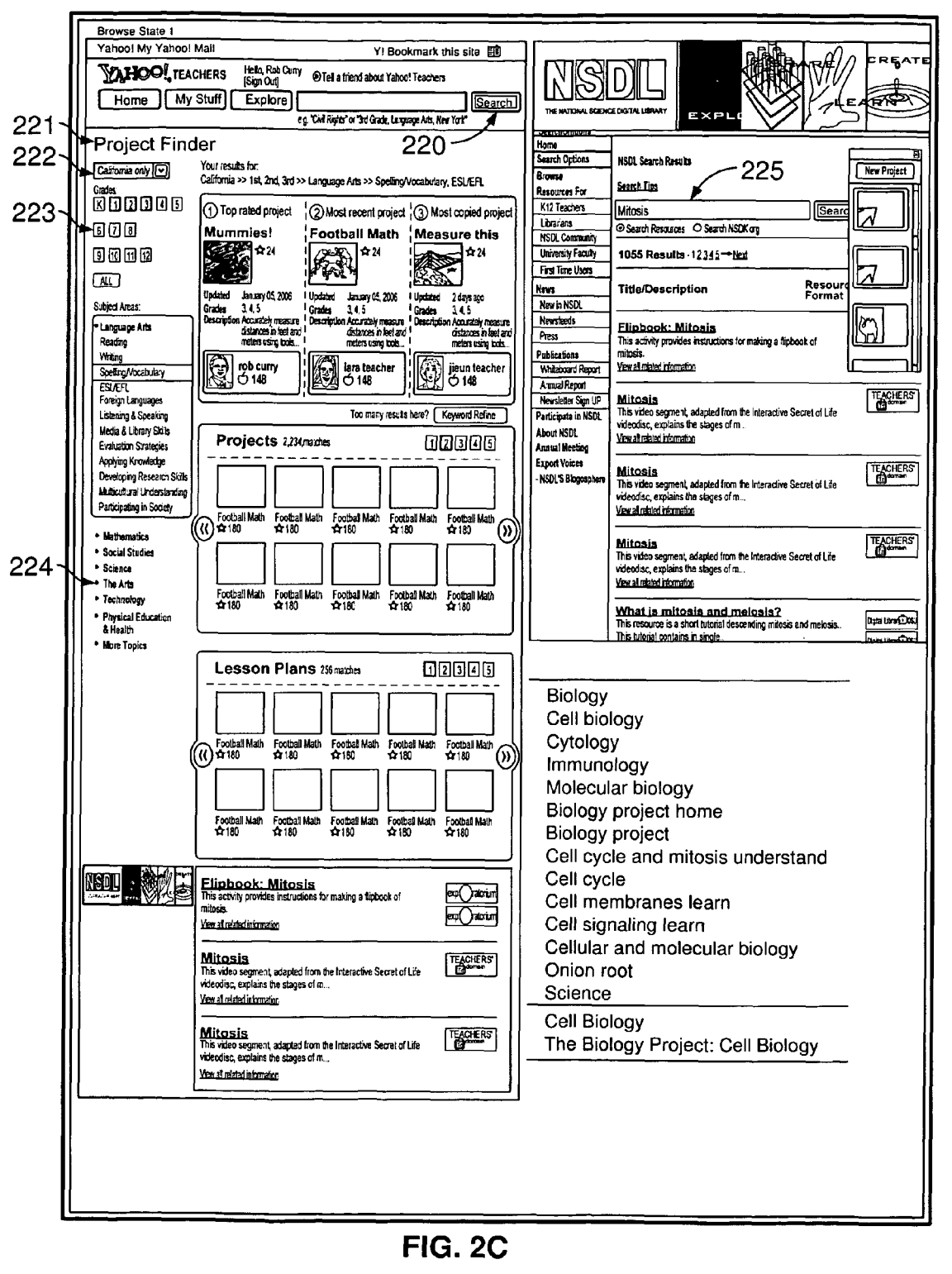

FIG. 2C illustrates a method for searching and browsing community and partner content according to an embodiment of the present invention. In the example shown in FIG. 2C, the webpage provides a search box 220 to enable vertical search against the Yahoo! Teachers database. In addition, the webpage provides a project finder section 221, where a user may search for information based on the state 222, grade level 223, and subject area 224 of interest. Furthermore, the webpage enables search of partner content, in this case provided by the National Science Digital Library (NSDL). Users can search for information on the NSDL website by entering a search query. In response to the search query, a search results page 225 is displayed.

Figure 2D:
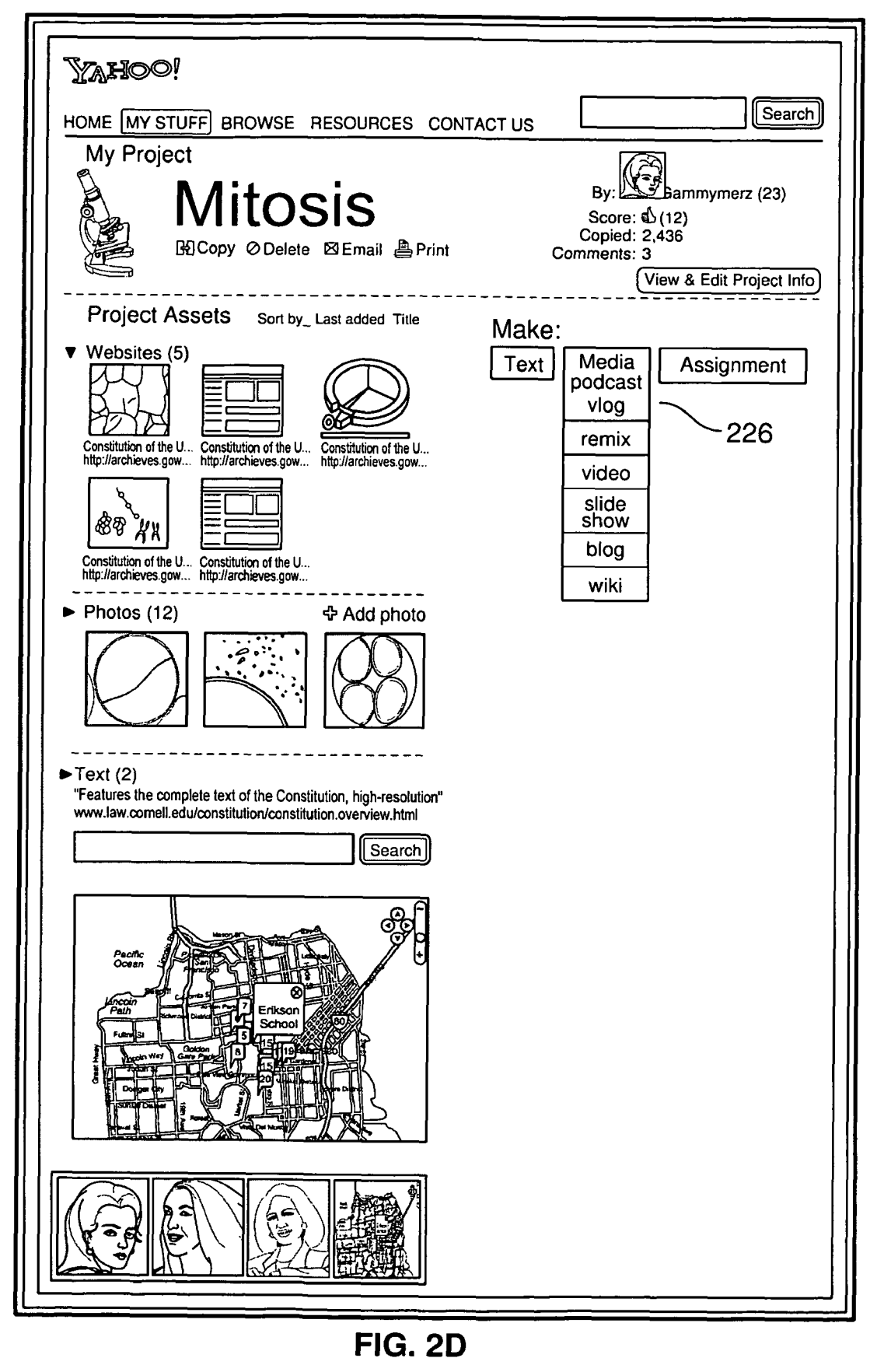
Figure 2E:
FIG. 2E illustrates an example of teacher-prepared project materials according to an embodiment of the present invention.

FIG. 2D illustrates tools for publishing user-generated content according to an embodiment of the present invention. As shown in FIG. 2D, the student may employ a suite of tools for publishing her projects on the Internet. For example, the project may be published in text form or in multimedia form, such as podcast, vlog, remix, video, slide show, blog, and wiki. FIG. 2E illustrates an example of teacher-prepared project materials according to an embodiment of the present invention. A student may access teacher-prepared project materials via the Lesson Info link 230. In this case, the assignment is to create a Cell Division Remix as shown in the image 231. The teacher has provided an example for the student to use as reference.

Figure 2F:
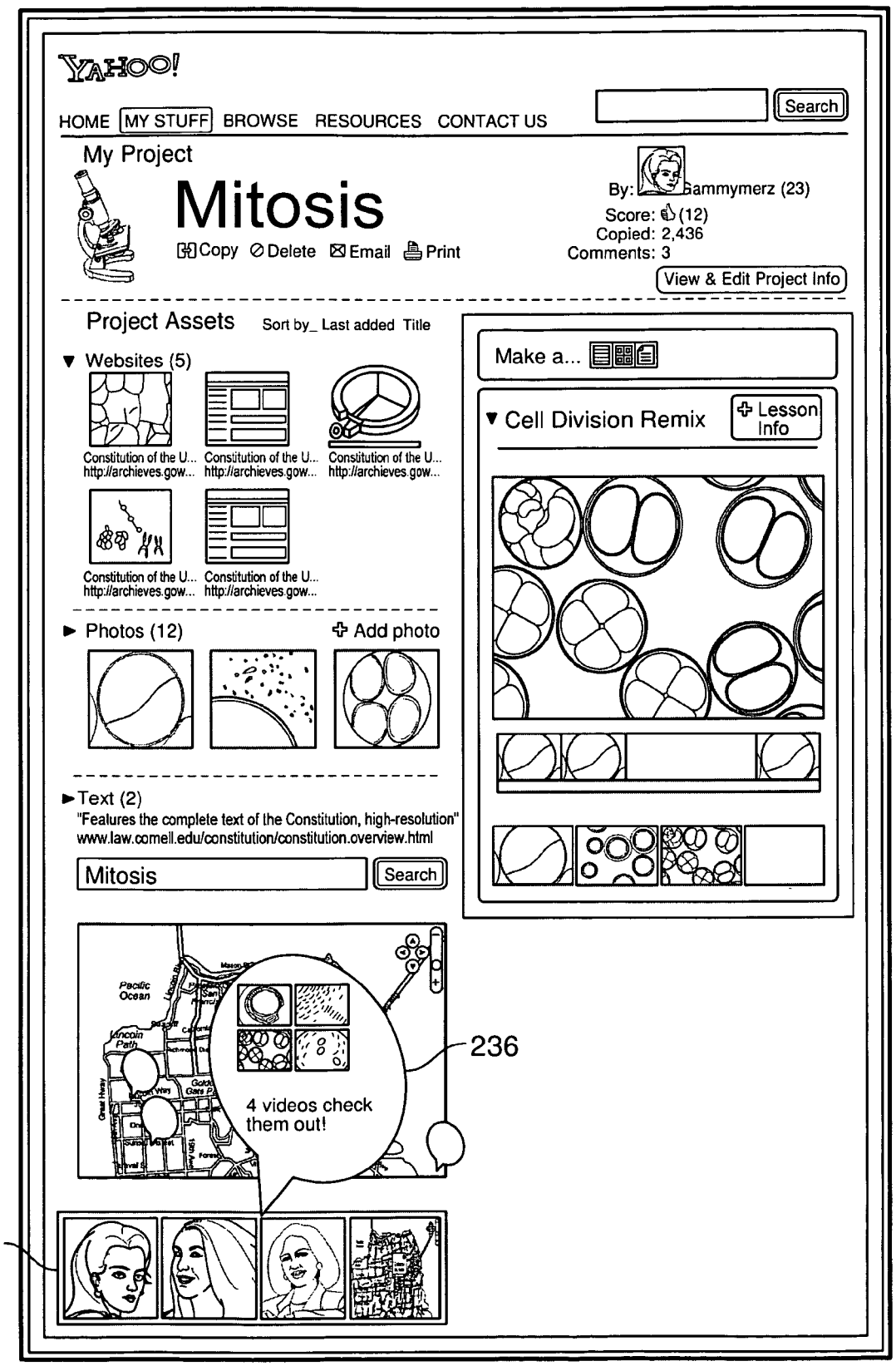
FIG. 2F illustrates a method of distributed collaborative knowledge generation through student group instant messaging asset exchange according to an embodiment of the present invention.

FIG. 2F illustrates a method of distributed collaborative knowledge generation through student group instant messaging asset exchange according to an embodiment of the present invention. As shown in FIG. 2F, the webpage provides a platform for distributed collaborative knowledge generation among a group of students 235. Geographic locations of the group members may be displayed on a map. A method for presenting one or more users on a user-defined map is described by U.S. patent application Ser. No. 11/361,268, entitled "User-Defined Private Maps," which is incorporated herein by reference in its entirety. The group members can communicate with each other through instant messaging (IM). A method for communicating with instant messaging is described in U.S. patent application Ser. No. 11/375,802, entitled "Method and System for Premium Access," which is incorporated herein by reference in its entirety. In this case, a member has found some interesting videos related to Mitosis and sends an IM 236 to the group stating "4 videos check them out!"

Figure 2G:
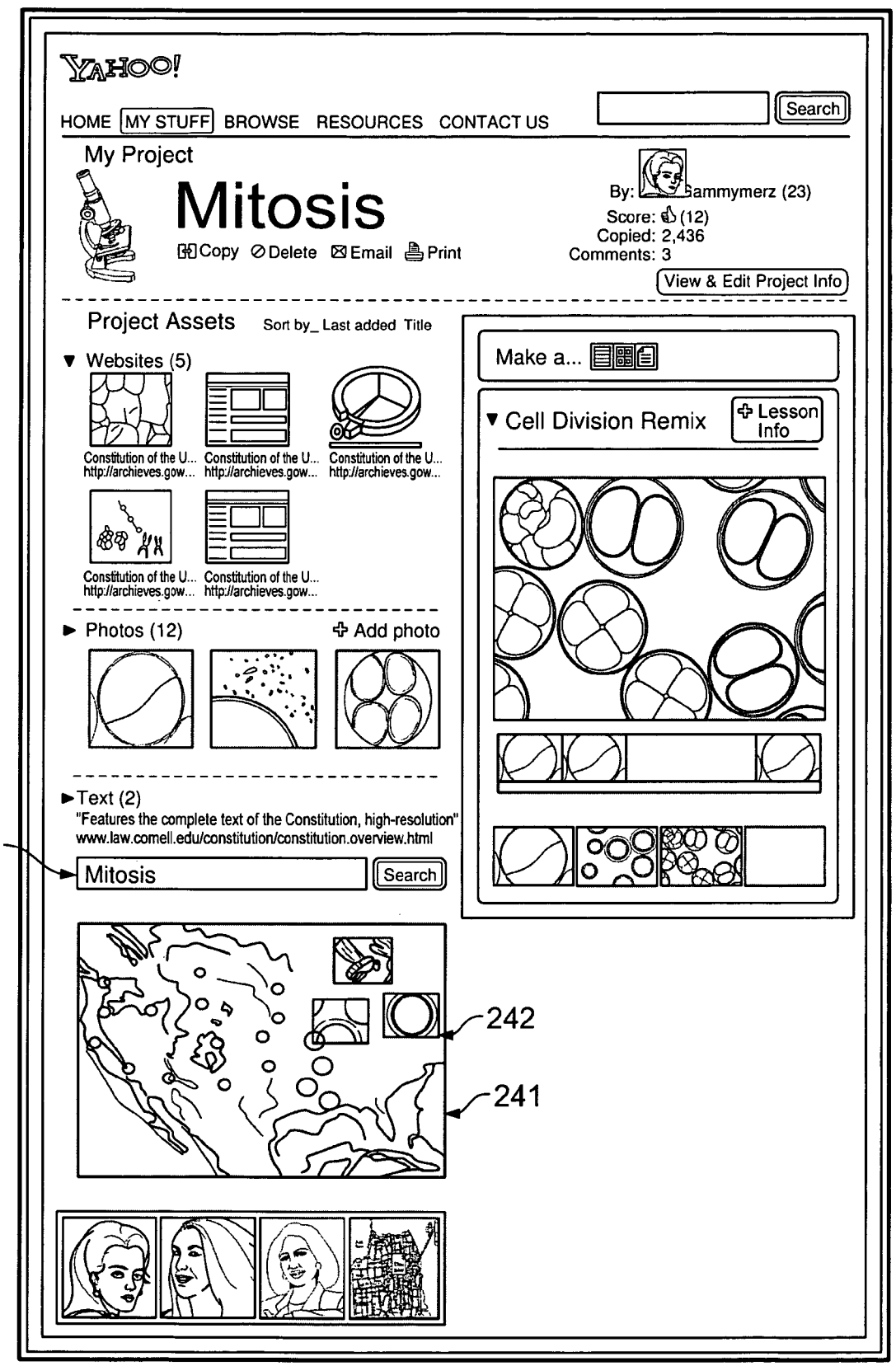
FIG. 2G illustrates a method of distributed collaborative knowledge generation through geographical query and display according to an embodiment of the present invention.

FIG. 2G illustrates a method of distributed collaborative knowledge generation through geographical query and display according to an embodiment of the present invention. In this example, a user may conduct a geographical query 240 of locations of people who have published information related to Mitosis in the United States. In response to the geographical query 240, a map 241 showing different clusters of people who have published information related to Mitosis are displayed. Each cluster of people is represented by a circle and the size of the circle is proportional to the number of people in the cluster. If the user decides to find out more information from a particular cluster, she may click on that cluster and further information about Mitosis 242 may be displayed from that cluster. Note that the Mitosis project by the user (Ammymerz) has earned a score of 12; it has been copied 2,436 times; and it has received 3 comments. These ratings and reviews may be used to determine the relevance of this project against future searches for other users. This dynamic online rating system may also be used to show the reputation, expertise of the user in a particular area of knowledge, and the quality of the collection.

FIG. 2H illustrates a method of distributed collaborative knowledge generation through real-time communications with other students according to an embodiment of the present invention. In this example, a first group member (Ammymerz) and a second group member (Nealeo) may learn from each other interactively in real time. After viewing and learning from the second group member's Mitosis project 247, the two users may exchange information asking further questions and provide comments to each other's projects. A group member can provide pointers to additional information on the subject.

Figure 2I:
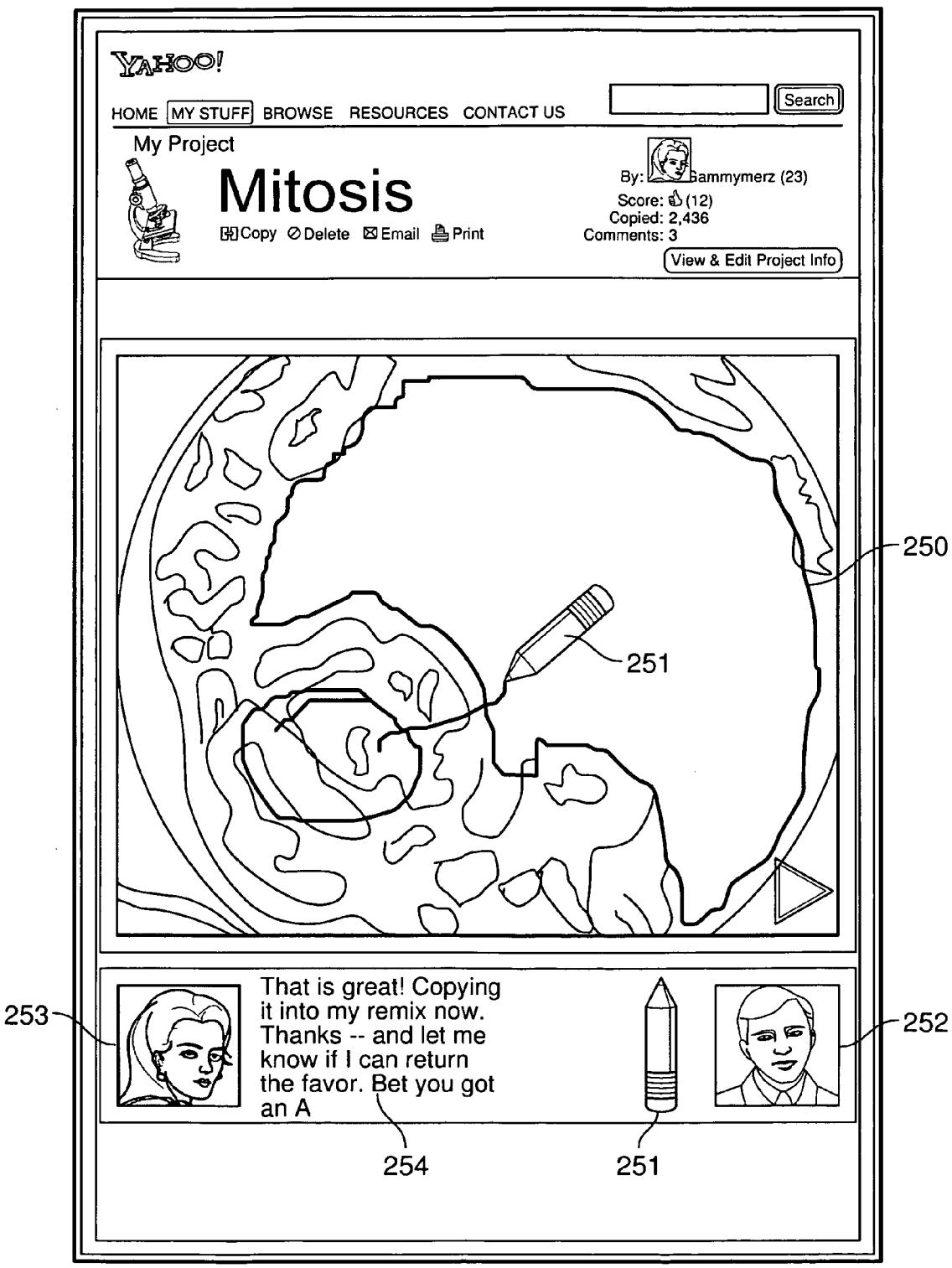
FIG. 2I illustrates a method of distributed collaborative knowledge generation through real-time annotations according to an embodiment of the present invention.

FIG. 2I illustrates a method of distributed collaborative knowledge generation through real-time annotations according to an embodiment of the present invention. In the example shown in FIG. 2I, the white line 250 indicates an annotation drawn by the pencil 251. The webpage shows the second user 252 owns the pencil 251, and the first user 253 may communicate with the second user through Instant Messenger (IM). In this manner, the method supports real-time collaboration among multiple users for creating and sharing knowledge on a particular subject of interest. In other embodiments multiple pencils (pens) may be supported such that multiple users can draw/write on the same display area together and the IM may be augmented by Skype of VOIP (voice-over-Internet protocol) or video.

Figure 3A:
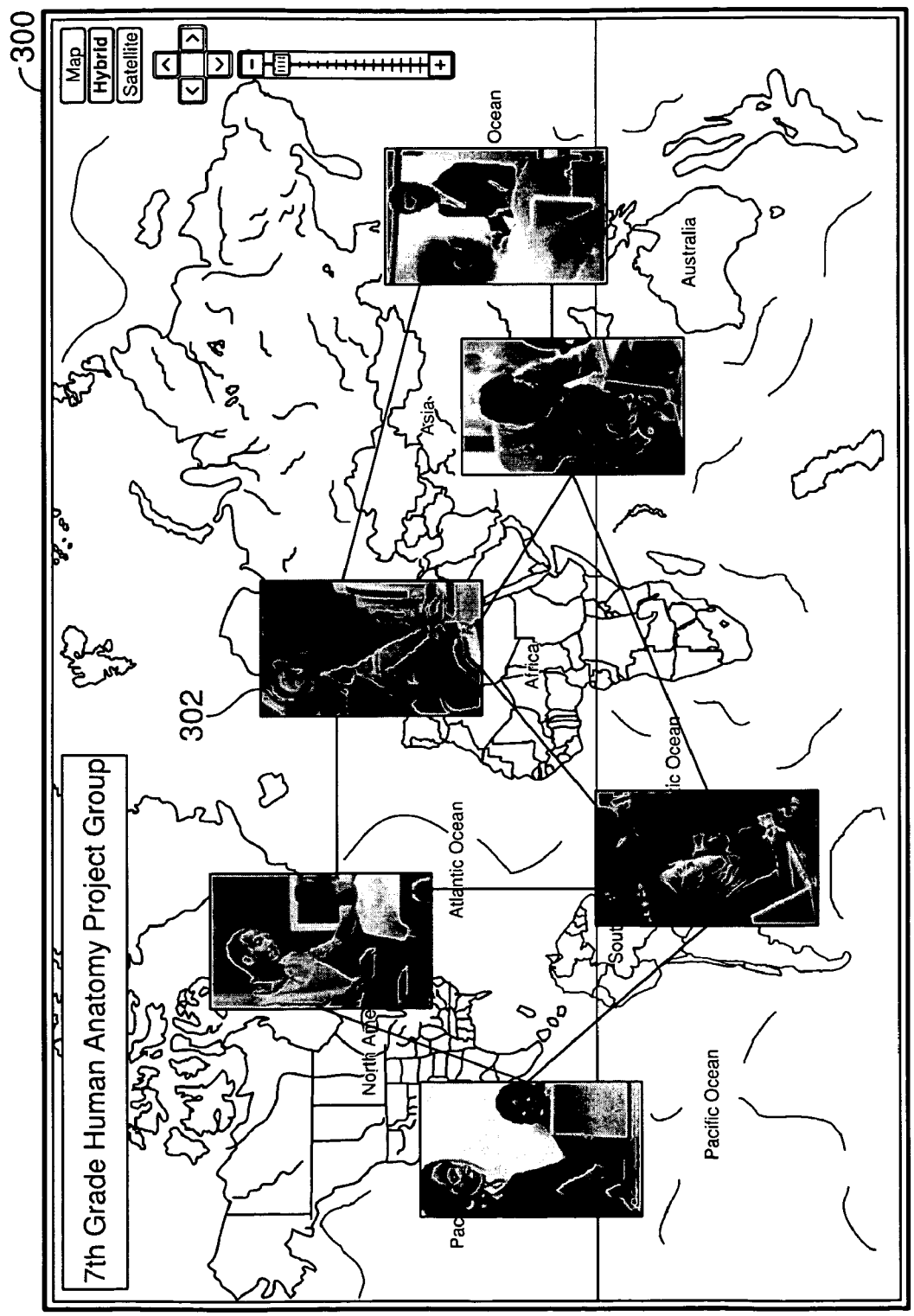
FIG. 3A illustrates a method for global collaboration and sharing according to an embodiment of the present invention.

FIG. 3A illustrates a method for global collaboration and sharing according to an embodiment of the present invention. In this example, a group of teachers and students may work on a project in a collaborative manner globally. This group is named the 7$^{th}$ Grade Human Anatomy Project Group. The locations of the group members are displayed on a world map. The numeral 302 indicates such a teacher-student pair located in Europe, who can collaborate and exchange ideas, resources, and data in real time as well as asynchronously.

Figure 3B:
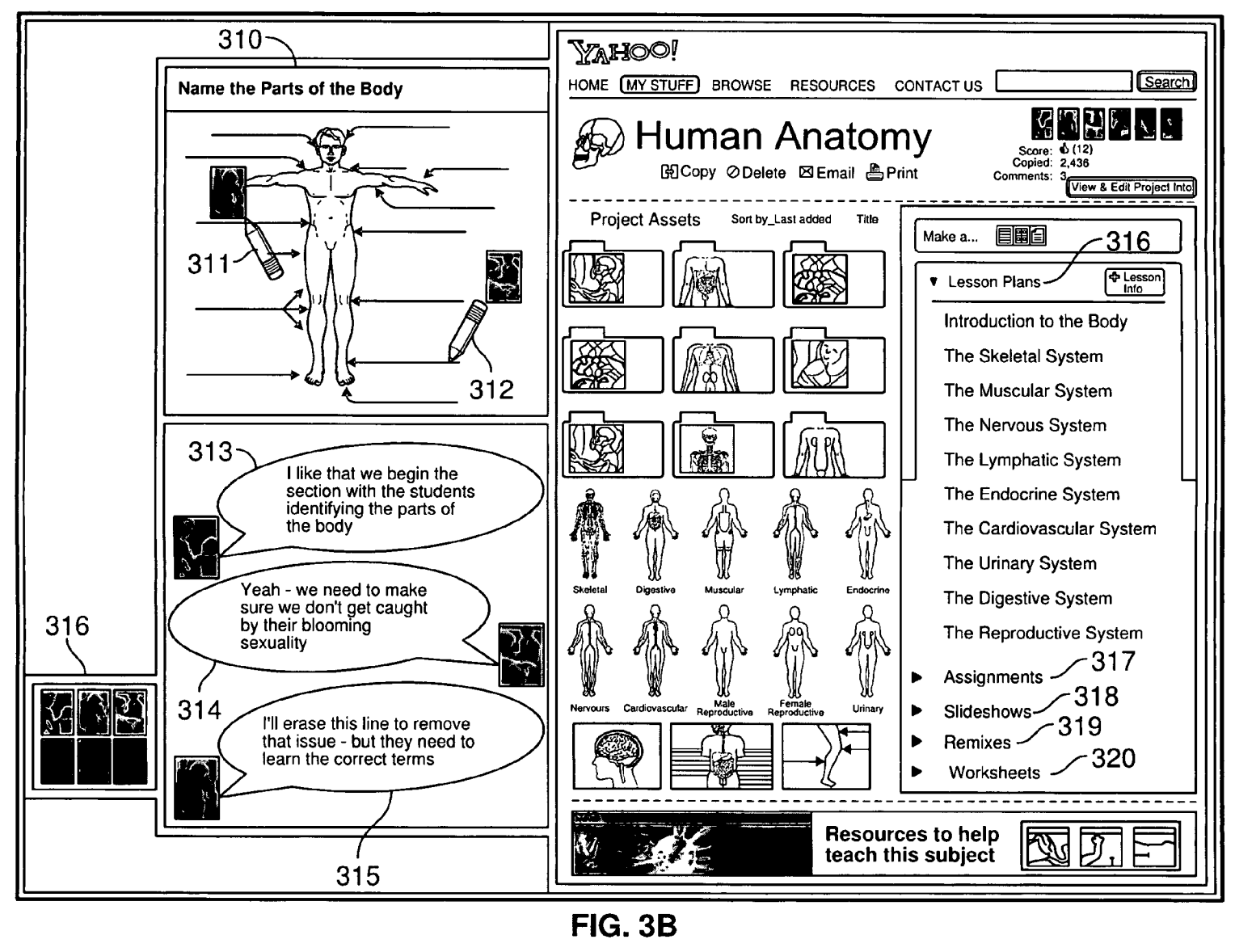

FIG. 3B illustrates a method for generating a collaborative knowledge collection according to an embodiment of the present invention. In this case, members from different locations of the world may work collaboratively to build a worksheet for their students. Multiple pens 311 and 312 may be employed by each group and the pens may operate independent of each other. In addition, the group members may be able to communicate with other in real time via instant messages 313, 314, and 315. A small window 316 shows the groups that are currently online. FIG. 3B also shows the group project webpage. The project assets are arranged hierarchically in different folders under the project assets section. Other images and drawings are also collected as parts of the projects assets. In the Lesson Info section, information about lesson plans 316, assignments 317, slideshows 318, remixes 319, and worksheets 320 are provided. The lesson plans are the repository for the curriculum materials generated collectively by the group, which are further categorized into lessons directed to different subsystems of the human body. Teachers may use these lesson plans directly with their students, and they may continue to add or refine the materials over time.

Figure 3C:
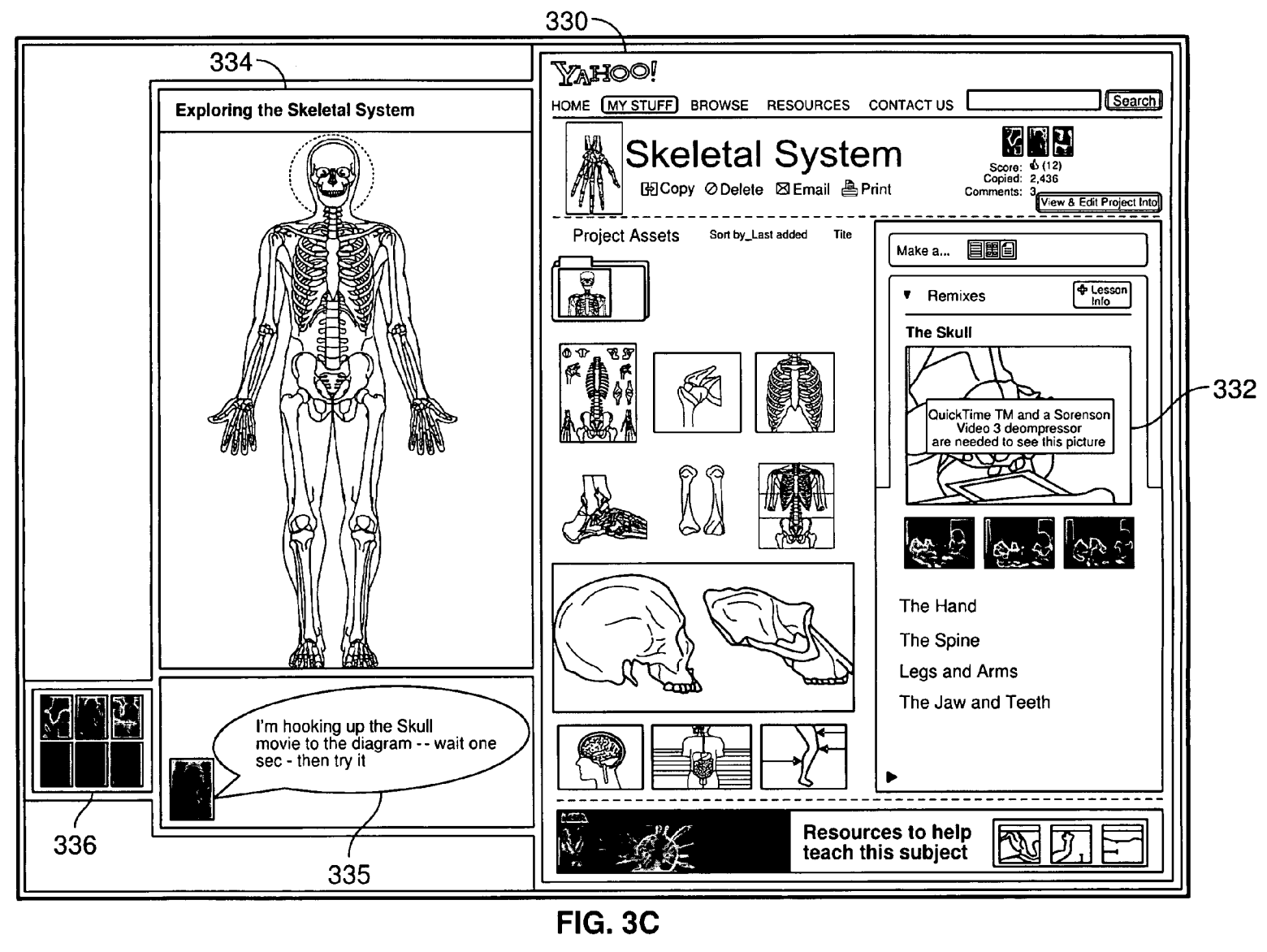

FIG. 3C illustrates another method for generating a collaborative knowledge collection according to an embodiment of the present invention. Teachers can directly link objects together and collaboratively build multimedia document. For example, the webpage 330 illustrates the skeletal system of the lesson plans shown in FIG. 3B, where different skeletal parts are shown in multimedia format. The diagram on the left hand side provides a full-view of the skeletal system 334. The group members may communicate with each other via IM 335 to build the collaborative knowledge collection for the group. Similar to FIG. 3B, the small window 336 indicates which groups are currently online.

Figure 4A:
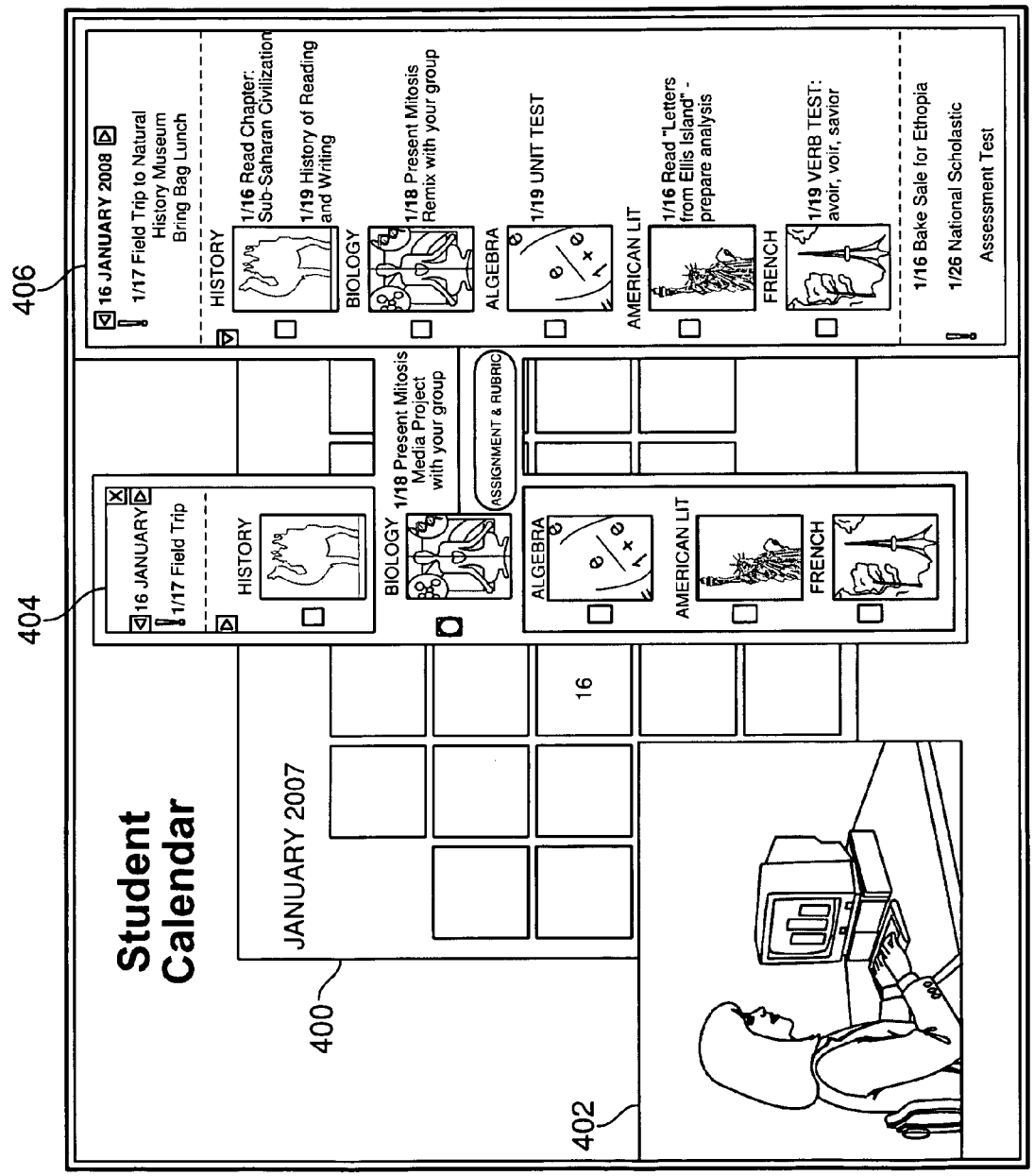
FIG. 4A illustrates a student calendar for managing school activities according to an embodiment of the present invention.

FIG. 4A illustrates a student calendar for managing school activities according to an embodiment of the present invention. In the example shown in FIG. 4A, the student calendar 400, which may receive its data from the distributed collaborative knowledge generation system set up by a teacher, may be accessed from a desktop 402 or from a mobile device any time and anywhere. A student may view major events and activities by selecting a particular date for display 404. For example, for January 16, the student has activities in subject areas of history, biology, algebra, American literature, and French. In particular, for the biology project, the student has the action item of "present Mitosis media project with your group" on January 18. In addition, the calendar also displays a reminder of the January 17 field trip. An expanded view of a day's events is shown with the numeral 406, where additional information about each event is shown, and reminders of other events are also displayed. A method for presenting information with multiple views is described by U.S. patent application Ser. No. 11/656,052, entitled "Method and System for Presenting Information with Multiple Views," which is incorporated herein by reference in its entirety.

Figure 4B:
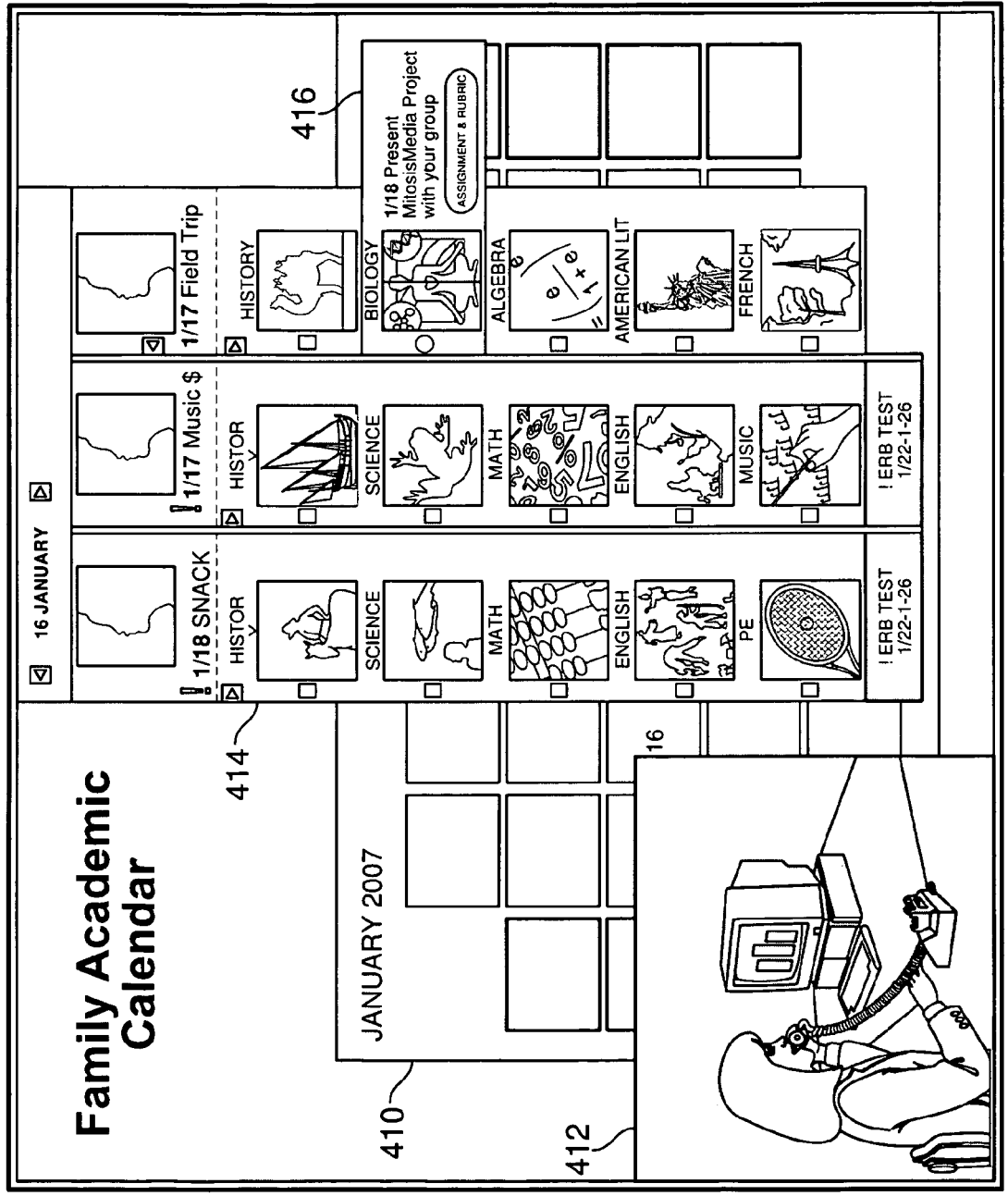
FIG. 4B illustrates a family academic calendar for managing family activities according to an embodiment of the present invention.

FIG. 4B illustrates a family academic calendar for managing family activities according to an embodiment of the present invention. Similar to the student calendar shown in FIG. 4A, the family academic calendar 410 may be accessed from a desktop 412 or from a mobile device any time and anywhere. A parent may view major events and activities by selecting a particular date for display 404. For example, for January 16, the student has activities in subject areas of history, science, math, English, PE, etc. In particular, for the biology project 416, the action item of "present Mitosis media project with your group" is due on January 18. In addition, the calendar also displays a reminder of the January 17 field trip and other events related to the student's school activities.

Figure 5B:
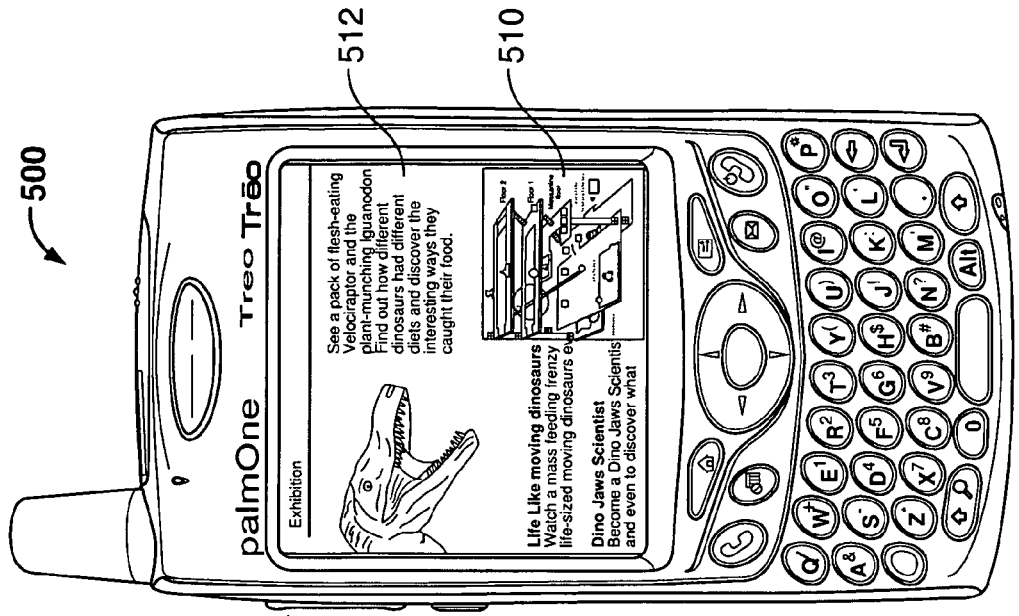
FIG. 5B illustrates a method for accessing educational materials on demand according to an embodiment of the present invention.
Figure 5A:
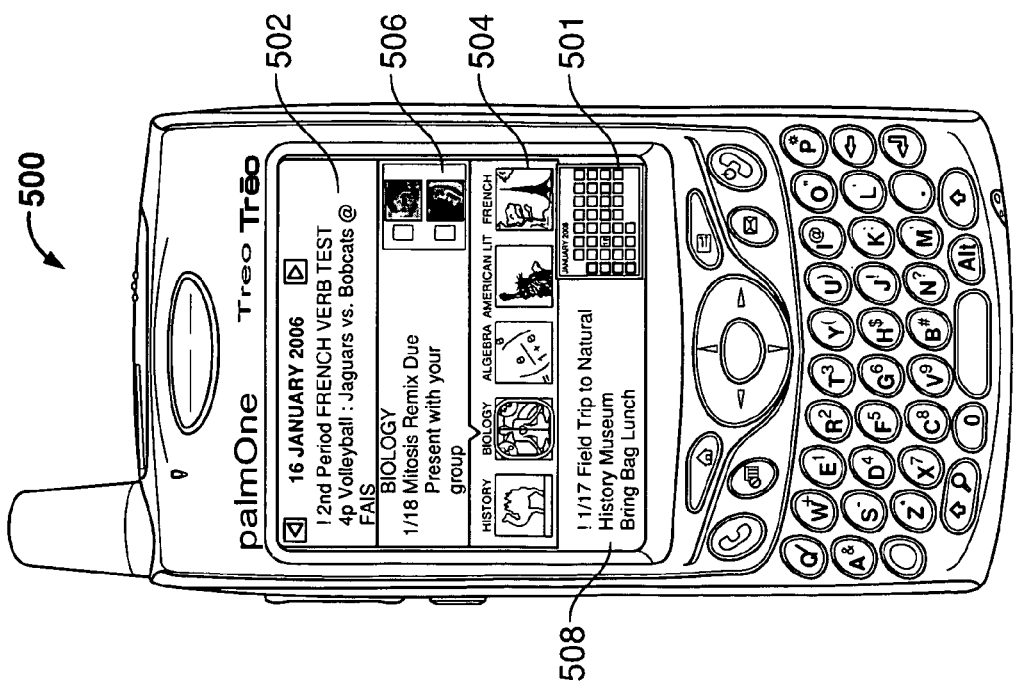
FIG. 5A illustrates a user device for accessing the distributed collaborative knowledge generation system according to an embodiment of the present invention.

FIG. 5A illustrates a user device for accessing the distributed collaborative knowledge generation system according to an embodiment of the present invention. This mobile device 500 allows a user to access calendar and school project information any time and anywhere. The mobile device contains a calendar 501 and allows a user to access calendar events for any date. For example, the mobile device 500 displays a list of events 502 on January 16. It displays all the projects that need the user's attention for that date, and displays more details about any project of interest, in this case the Biology project. Furthermore, the mobile device displays any upcoming event 508 (January 17, field trip) and the action items relate to the event (bring bag lunch).

FIG. 5B illustrates a method for accessing educational materials on demand according to an embodiment of the present invention. The method implements a context-aware application, which knows about the multiple inputs that a mobile device may receive data from the system, the museum, the teacher, or other students in the class, etc. In the example of FIG. 5B, the mobile device 500 is used on a field trip to a dinosaur's exhibit in a natural history museum. A map (floorplan) of the museum 510 can be retrieved by the mobile device over a wireless network. As the user navigates through the museum, the user device 500 is able to detect various information hot-spots around the museum and display such information 512 on the screen of the mobile device. The user is then given the option to download relevant educational materials on demand. In one example, a teacher may design a lesson plan to include a series of information hot-spots that students need to visit in the museum. By guiding the students through the museum with interactive information display and on-demand download of educational materials, the distributed collaborative knowledge generation system can provide more interesting and efficient learning experience to the students. A method for communicating with multiple users via a map is described by U.S. patent application Ser. No. 11/361,268, entitled "Method and System for Communicating with Multiple Users via a Map over the Internet," which is incorporated herein by reference in its entirety.

Figure 6:
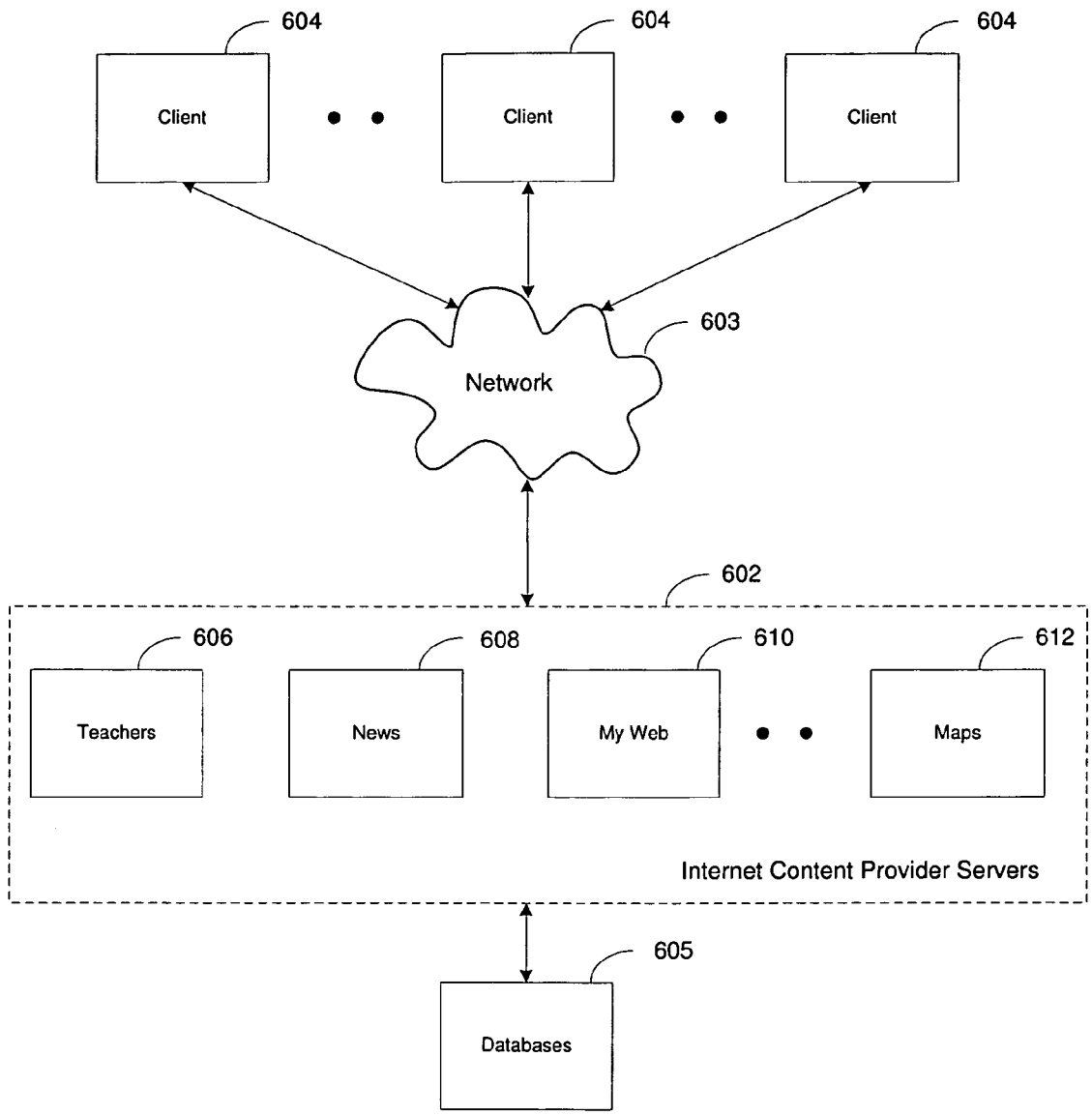
FIG. 6 illustrates a system for running map applications on a website according to an embodiment of the present invention.

FIG. 6 illustrates a system for running map applications on a website according to an embodiment of the present invention. The system includes one or more Internet content provider servers 602, databases 605, and one or more clients 604. The servers 602 interface with the clients 604 via a communication network 603. The Internet content provider servers 602 are host servers operable to provide content to clients 604 via the network 603. One or more of the servers host websites and include the map functions. The databases 605 are operable to store data provided by the servers 602 and/or clients 604. The databases can communicate with the servers 602 or clients 604 via the network 603. The databases can store data items included in the web pages, such as maps and user information.

Alternatively, the servers 602 may include the databases, processors, switches, routers, interfaces, and other components and modules. Each of the servers 602 may comprise one or more servers, or may be combined into a lesser number of servers than shown, depending on computational and/or distributed computing requirements. The servers 602 may be located at different locations relative to each other. The databases may also be separately connected to the servers 602. There may be more or fewer than two databases, depending on computational and/or distributed computing requirements. The databases may be located at different locations relative to each other and the servers 602.

Each of the clients 604 may be a general-purpose computer, such as a personal computer, having a central processing unit (CPU), a memory, an input device, an output device, and a display. Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented as the clients 604. Each of the clients 604 may also implement analog and digital baseband circuitry, power management circuitry, radio frequency (RF) transceiver, and battery interface and charging circuitry. Clients 604 may include one or more applications, program modules, and/or sub-routines. As an example, clients 604 may include a browser application (e.g., Internet Explorer, etc.) and a graphical user interface (GUI) to access websites and web pages provided by the servers 602 and data stored at the databases 605. Clients 604 may be remote from each other, the servers 602, and/or the databases 605. The databases 605 can be implemented MySQL databases.

The network 603 is a communications network, such as a local area network (LAN), a wide area network (WAN), or the Internet. When the network 603 is a public network, security features (e.g., VPN/SSL secure transport) may be included to ensure authorized access within the system.

The servers 602 further include a plurality of individual domains, for example, Teachers domain 606, news domain 608, My Web domain 610, Maps domains 612, etc. A domain is a computer system implemented with different hardware and software for a specific application, such as the Teachers applications, news applications, and maps applications. The Teachers domain implements Web 2.0 functionalities using a combination of DHTML, CSS, JavaScript, Widget Engine, and "Asynchronous JavaScript and XML" (AJAX).

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A distributed collaborative knowledge generation computer system, comprising:

a processor;

a storage medium for tangibly storing thereon program logic for execution by the processor, the program logic comprising:

database logic executed by the processor for storing a dynamic knowledge database related to the computer system;

search services logic executed by the processor for searching for a subset of content information in response to a query by a student user, the query relating to a subject of interest to the student user and the subset of the content information relating to the subject of interest;

web services logic executed by the processor for retrieving and gathering the subset of the content information from the web in response to the query by the student user;

presentation services logic executed by the processor for sharing the subset of the content information with multiple users accessing the distributed collaborative knowledge generation system via the web; and data services logic executed by the processor for improving the dynamic knowledge database by managing the subset of the content information by providing interfaces between the one or more databases, the search services module, the web services module, and the presentation services module.

2. The system of claim 1, wherein the one or more databases comprise at least one of:
- a user-generated content database storing content information provided by users; and
- a thumbnails database storing thumbnail images of snapshots of web pages.

3. The system of claim 1, wherein the one or more databases further comprise at least one of:
- a standards database storing information related to educational standards; and
- a schools database storing information provided by one or more schools.

4. The system of claim 1 further comprising:
- a thumbnail caching module obtaining thumbnail images of web pages from a thumbnail service.

5. The system of claim 1 further comprising:
- a standards feeder module obtaining educational standards from an academic standards source.

6. The system of claim 1 further comprising:
- a schools feeder module obtaining school information from a schools data source.

7. The system of claim 1, wherein the search services module comprises at least one of:
- a vertical search engine performing searches against the content information within the system; and
- a publisher search module perform searches against a user-specified website.

8. The system of claim 1, wherein the presentation services module comprises at least one of calendar view, map view, grid view, and list view for presenting the content information.

9. The system of claim 1, wherein the web services comprises a data collection module annotating the content information with metadata.

10. The system of claim 1, wherein the data service module comprises:
- a tagging platform tagging the content information from one or more input sources;
- a user identity module identifying student users of the system; and
- a user profile module managing a student user database of the system.

11. The system of claim 10, wherein the data service module further comprises:
- an advertising module sharing revenues between the one or more input sources.

12. The system of claim 10, wherein the tagging platform comprises:
- a sponsorship module tagging the content information with an attribution of a sponsor.

13. The system of claim 10, wherein the tagging platform further comprises:
- a geographical module tagging student users according to their corresponding geographical locations.

14. The system of claim 1 further comprising:
- a feedback module gathering student user-generated feedbacks about the system.

* * * * *